No. 673,103. Patented Apr. 30, 1901.
H. C. WILLIAMSON & H. PRIES.
DUMP CAR.
(Application filed Nov. 19, 1900.)
(No Model.) 7 Sheets—Sheet 1.

Witnesses: Inventors.

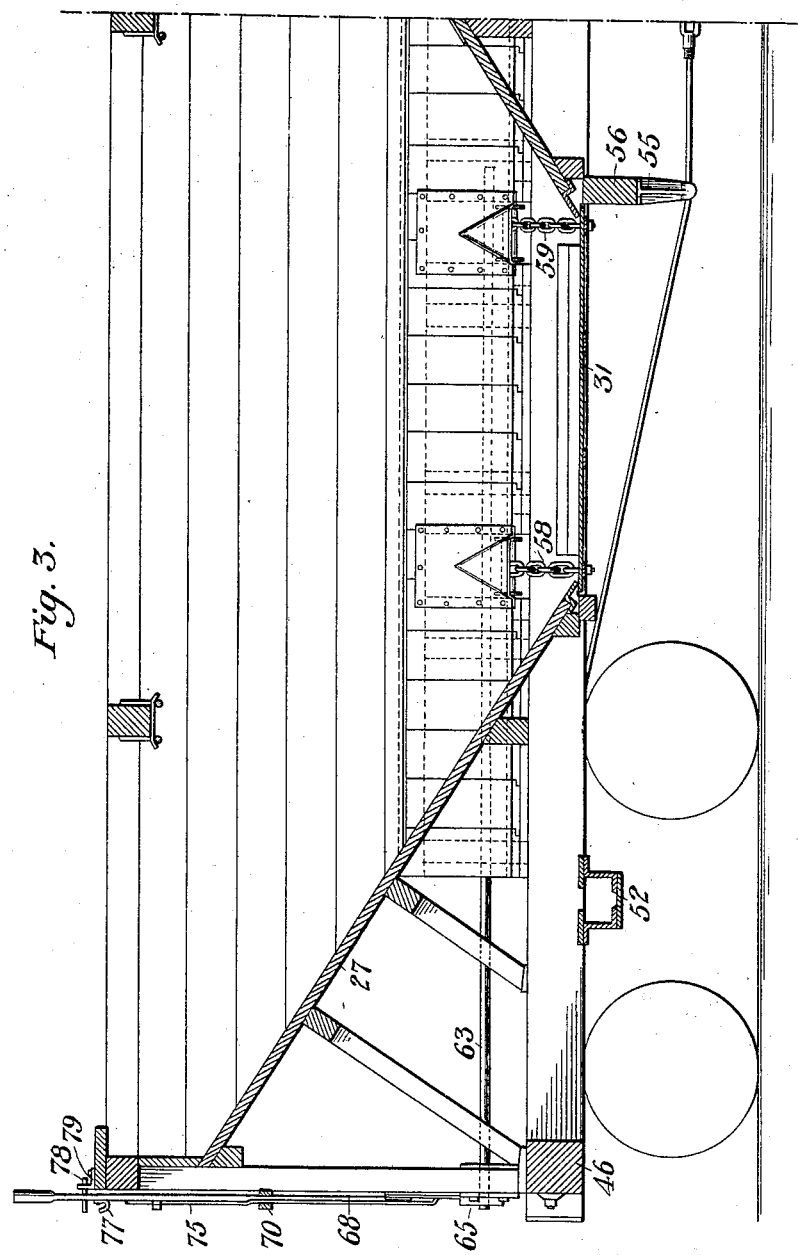

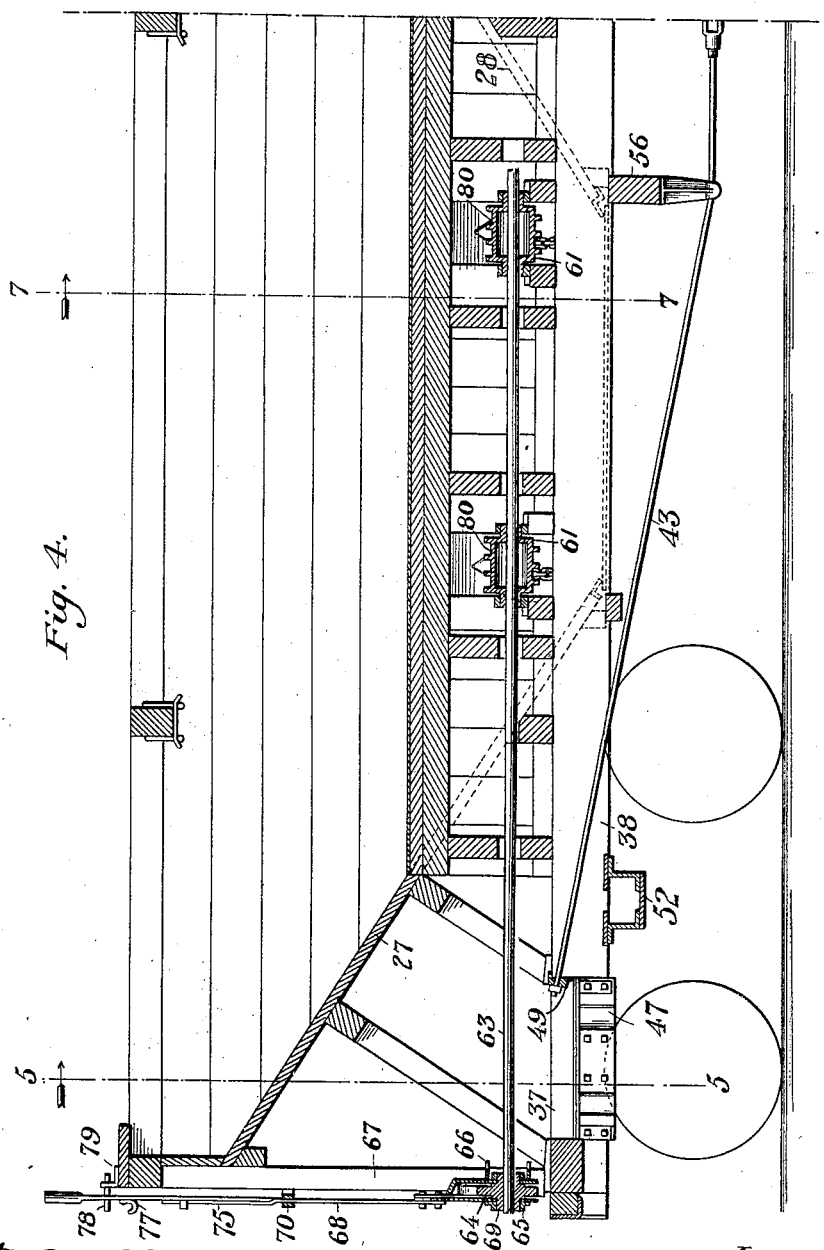

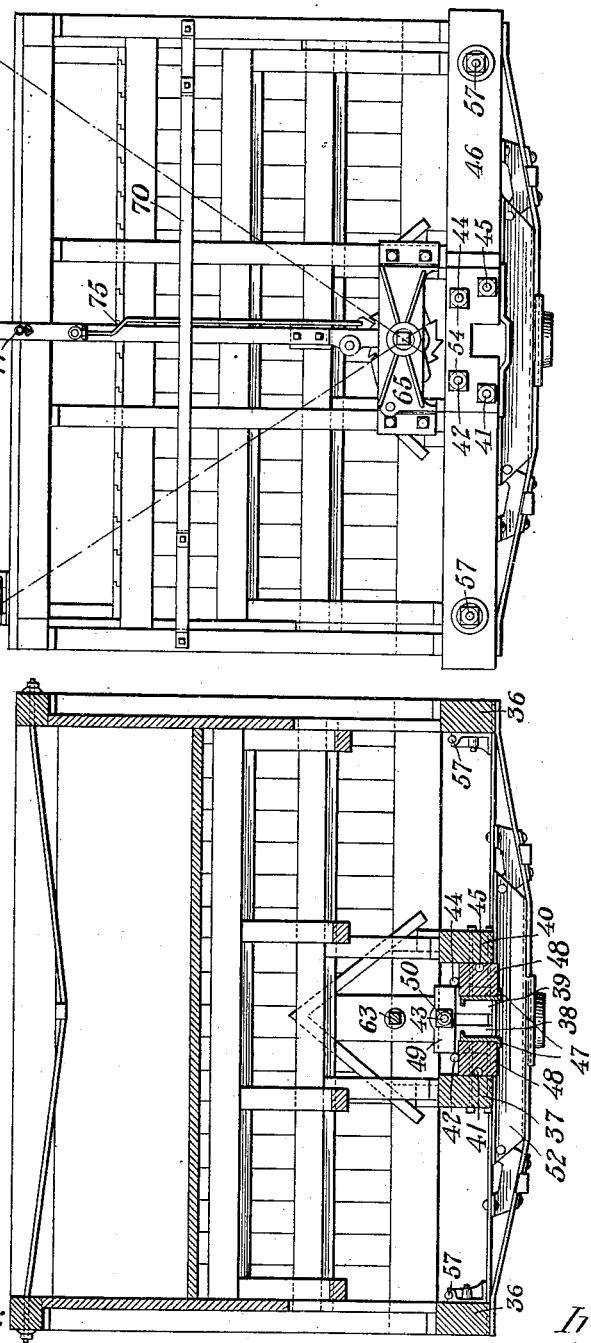

No. 673,103.

Patented Apr. 30, 1901.

H. C. WILLIAMSON & H. PRIES.
DUMP CAR.

(Application filed Nov. 19, 1900.)

(No Model.)

7 Sheets—Sheet 5.

Witnesses:
R. A. Balderson
Geo. E. Garrett

Inventors,
Henry C. Williamson
Herman Pries
By Louis K. Gibson
Atty.

No. 673,103. Patented Apr. 30, 1901.
H. C. WILLIAMSON & H. PRIES.
DUMP CAR.
(Application filed Nov. 19, 1900.)
(No Model.) 7 Sheets—Sheet 6.

Witnesses:
C. E. Combs
E. M. Hatcher

Inventors:
Henry C. Williamson
and Herman Pries.
By Attorney:
Louis K. Gibson

No. 673,103. Patented Apr. 30, 1901.
H. C. WILLIAMSON & H. PRIES.
DUMP CAR.
(Application filed Nov. 19, 1900.)
(No Model.) 7 Sheets—Sheet 7.
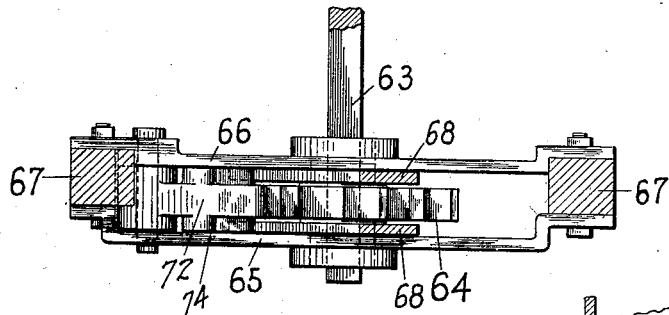
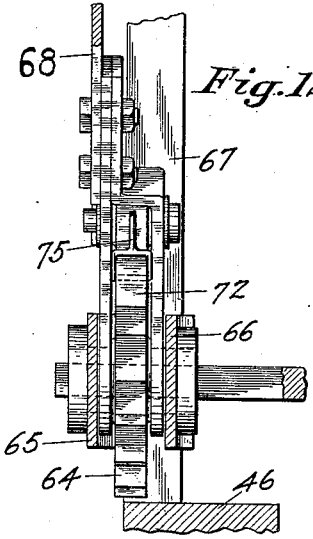
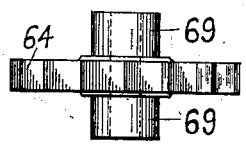
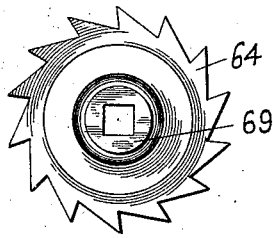
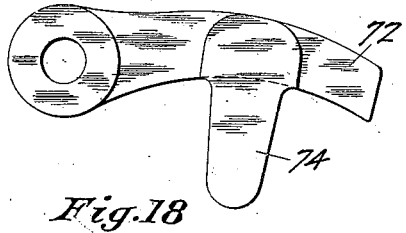
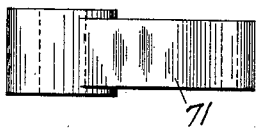
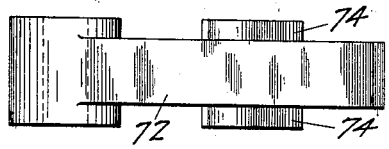
Witnesses
C. E. Combs
E. M. Klatcher
Inventors
Henry C. Williamson
and Herman Pries
By Louis K. Gleeson Atty.
THE NORRIS PETERS CO., PHOTO-LITHO., WASHINGTON, D. C.

UNITED STATES PATENT OFFICE.

HENRY C. WILLIAMSON AND HERMAN PRIES, OF MICHIGAN CITY, INDIANA.

DUMP-CAR.

SPECIFICATION forming part of Letters Patent No. 673,103, dated April 30, 1901.

Application filed November 19, 1900. Serial No. 37,056. (No model.)

*To all whom it may concern:*

Be it known that we, HENRY C. WILLIAMSON and HERMAN PRIES, citizens of the United States, and residents of Michigan City, county of Laporte, and State of Indiana, have invented certain new and useful Improvements in Dump-Cars, of which the following is a specification and which are illustrated in the accompanying drawings, forming a part thereof.

The invention relates to that type of cars which dump through the bottom, the object of the invention being to increase the strength and general utility of cars of this type, particularly with a view to adapting them to carry loads of great weight. This object is attained in the construction hereinafter described, and illustrated in the accompanying drawings, in which—

Figure 1:
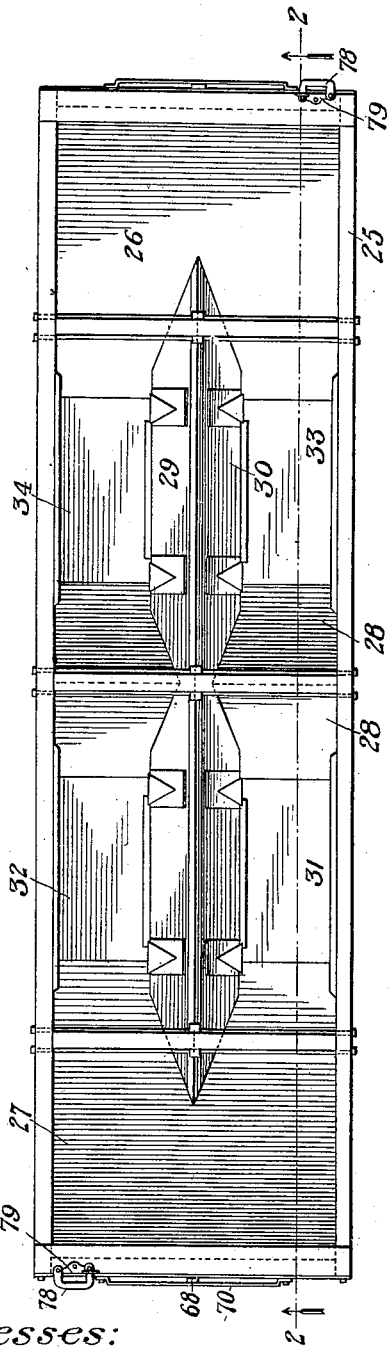
Figure 2:
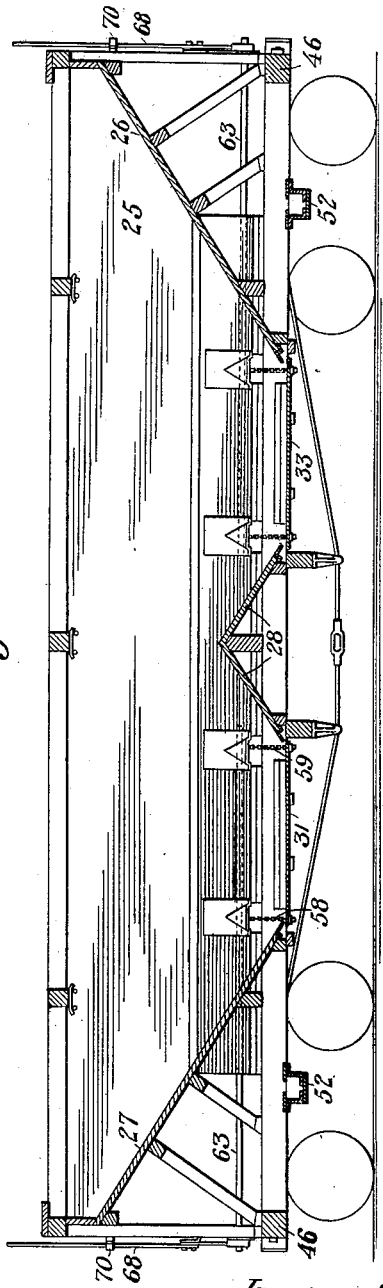
Figure 7:
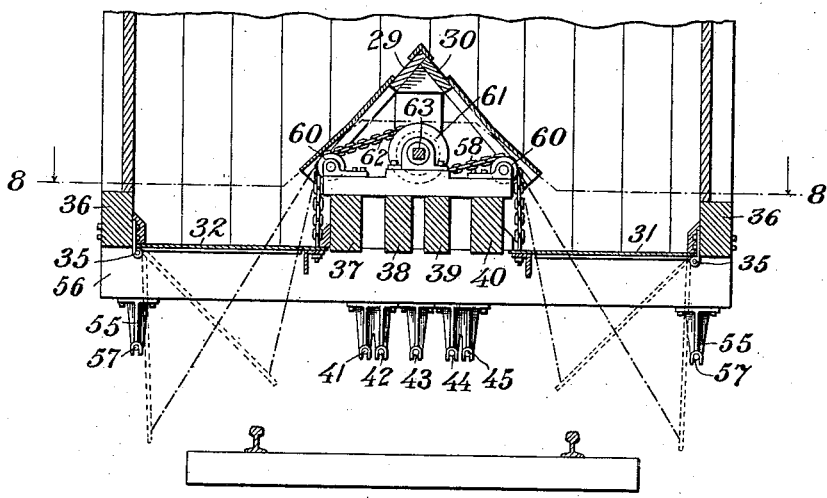
Figure 8:
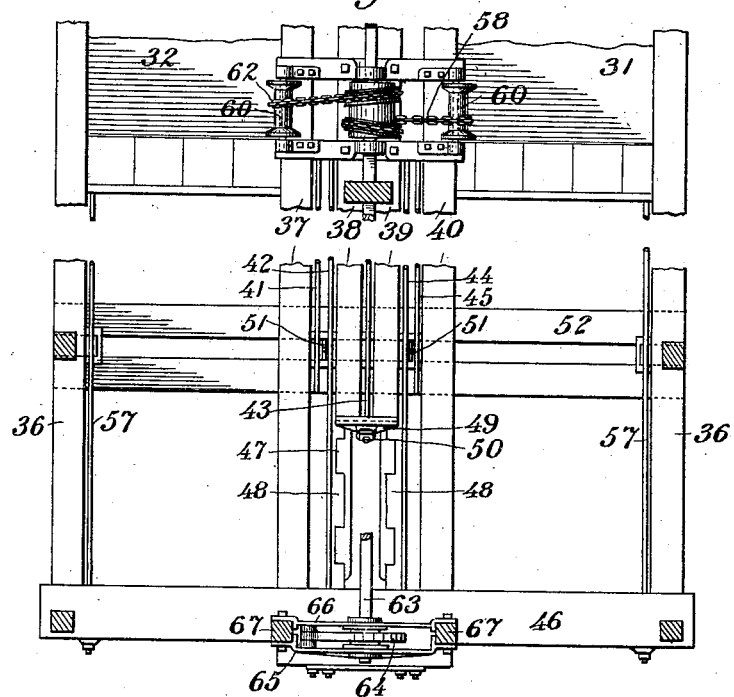
Figure 9:
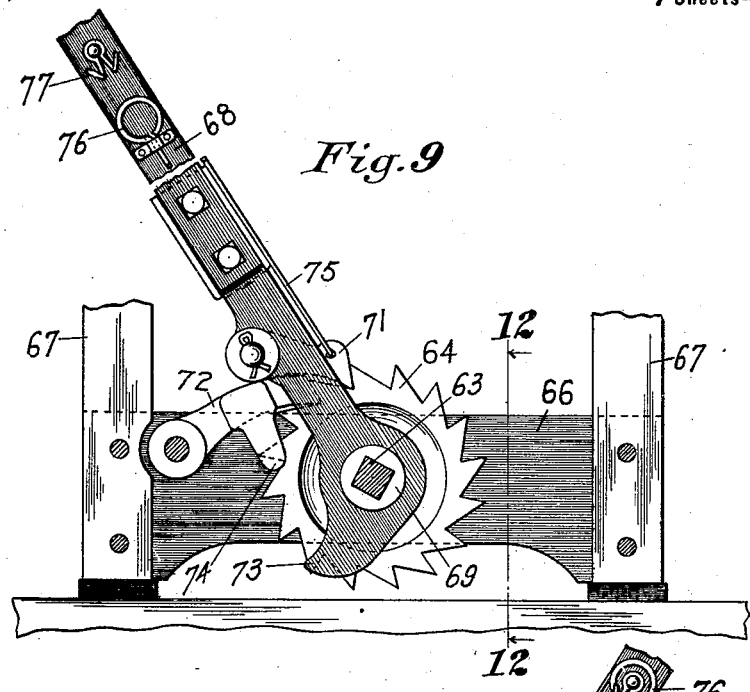
Figure 10:
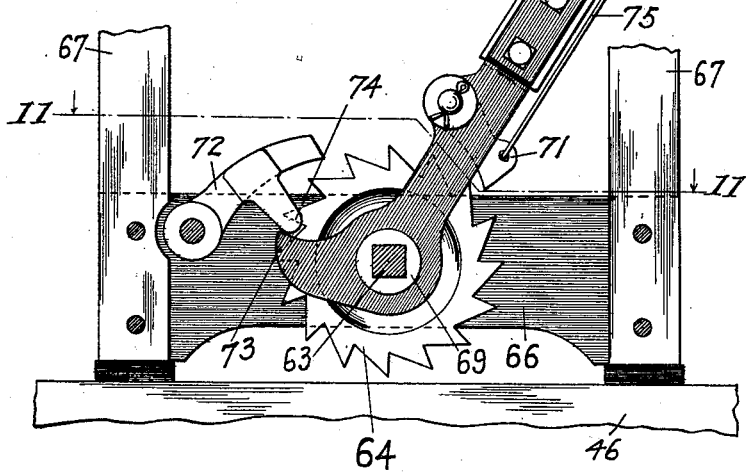

Figure 1 is a plan view of the car; Fig. 2, a longitudinal vertical section on the line 2 2 of Fig. 1; Fig. 3, a detail vertical section on the same plane and drawn to a larger scale. Fig. 4 is a detail central vertical section. Fig. 5 is a transverse section on the line 5 5 of Fig. 4. Fig. 6 is an end elevation. Fig. 7 is a transverse section on the line 7 7 of Fig. 4. Fig. 8 is a detail plan section on the line 8 8 of Fig. 7. Figs. 9 and 10 are detail elevations in different positions of the lever and ratchet-and-pawl mechanism for controlling the dump-car. Fig. 11 is a detail plan section on the line 11 11 of Fig. 10. Fig. 12 is a detail section on the line 12 12 of Fig. 9. Figs. 13 and 14 are details of a ratchet-wheel used in the dumping-mechanism. Figs. 15 and 16 are details of the pawl for actuating the ratchet-wheel, and Figs. 17 and 18 are details of the retaining-pawl coöperating with the ratchet-wheel.

The body of a car is shown at 25 as being, generally speaking, of the gondola type. At each end of the car there is a longitudinally-disposed incline 26 27, extending downwardly toward the center of the car. At the middle of the car there is a double incline 28, sloping downwardly in each direction toward the ends of the car and longitudinally as to the car-body, and at its central line there is a double incline, (designated 29 and 30,) which extends from the incline 26 to the incline 27. These several inclines are so disposed that four dumping-apertures are provided—two at each end and two at each side of the car—and each of these apertures is provided with a door, (shown at 31 32 33 34,) each of which is hinged, as shown at 35, to a side sill 36 of the car, its swinging edge meeting one of the central sills.

The car is provided with four central sills 37 38 39 40, all located below the central inclines 29 30 and spaced apart for the accommodation of the central truss-rods, five in number and marked, respectively, 41, 42, 43, 44, and 45. The outer pair 37 and 40 of the central sills extend the entire length of the car and are framed into the end sills 46. The inner pair 38 and 39 of the central sills are shorter, their ends abutting against the cheek-plates 47 of the draft-timbers 48. A truss-rod plate 49 is applied to the ends of the sills 38 39, and the truss-rod 43 passes through this plate and has applied to its ends nuts 50, so that its strain is applied to the ends of the sills through the plate. The two outer pairs of the central truss-rods pass over a truss-saddle 51, supported by the body-bolster 52, and the two members of each pair diverge in vertical plane from this saddle toward their ends, the outer rods 41 and 45 passing longitudinally through the draft-timbers 48 and the two inner rods of each pair, 42 and 44, passing over these timbers. All of these four truss-rods pass through the end sill 46 and a plate 53 applied thereto, and their ends are provided with nuts, as 54. This arrangement of central sills and central truss-rods provides two longitudinal trusses for the center of the car—viz., an inner truss, of which the sills 38 and 39 constitute the compression members and the rod 43 the tension member, which truss not only aids in supporting the load, but receives the thrust strain of the draw-bars, and an outer truss, of which the sills 37 and 40 constitute the compression member and the rods 41 and 42 and 44 and 45 the tension member. This truss in addition to its function of in part supporting its load also sustains the drawing strain of the draw-bars. The car is also provided with the usual side truss-rods 57 and with suitable queen-posts 55 and needle-beams 56.

Each of the dump-doors is supported and controlled by means of two chains, as 58 59, which pass upwardly over spools or sheaves 60 and are secured to and wound about drums 61, the chains 58 59 of the door, as 31, at one side of the car passing under the drums and the chains, as 62, of the door, as 32, on the opposite side of the car passing over the drums, so that the doors open and close simultaneously.

The doors at the two ends of the car are preferably separately controlled, and to that end a rod 63 projects inwardly from each end of the car, along its central line and below the longitudinally-disposed double incline, and upon each of these rods is mounted a pair of drums 61, to which the chains 58 59 are attached. Upon the outer end of each rod there is fixed a ratchet-wheel 64, the hubs of which are journaled in the plates 65 66, secured to a pair of uprights 67, forming a part of the framing of the car.

The hubs of the drums 61 are journaled in suitable bearings carried by cross-timbers of the car-frame. A bifurcated lever 68 is loosely pivoted on the hubs 69 of the ratchet-wheel 64, and its upper end projects above the end of the car, passing behind a guide-strap 70, secured across the end of the car. An actuating-pawl 71 is pivoted between the legs of the lever 68 and coöperates with the ratchet-wheel 64. A retaining-pawl 72 is pivoted between the plates 65 66, so as to engage the ratchet-wheel 64. Each of the legs of the lever 68 is provided with a forwardly-projecting toe 73, adapted to engage lugs 74, depending from the retaining-pawl 72, so that when the lever is swung to the limit of its advance movement this pawl is raised so as to free the ratchet-wheel and permit the doors 31 and 32 or 33 and 34 to fall. The pawl 71 is manually controlled by means of a rod 75, having at its upper end a ring 76, which may be caught over the hooks 77, secured to the lever 68, for the purpose of suspending the pawl out of engagement with the ratchet-wheel.

A hasp 78, pivoted at the top of the end of the car to a socket-plate 79, is adapted to retain the lever 68 when at the limit of its backward movement, this hasp being adapted to be secured by an ordinary car-seal or by a padlock, so as to prevent tampering with the dumping mechanism when the car is in transit.

Each of the drums 61 is provided with spiral peripheral grooves 80 for receiving the chains. These grooves have flat bottoms and vertical side walls, and the chains employed are formed with straight links, so that the planes of adjacent links are perpendicular each to the other. The links are somewhat wider than the grooves 80, and the chains are so secured to the drums that as they are wound thereupon their links enter the grooves obliquely, thus effectually preventing any twisting or kinking in the chains and consequent variations in their length.

As thus constructed, the car may be built in very large sizes, so as to have a capacity of fifty tons or more of ore or coal, the central sill and truss-rod arrangement, without trenching upon the body of the car, and thereby limiting its capacity, affording adequate strength both to support the load and withstand the drawing or pushing strain when the car is coupled into a long and heavy train.

The dumping mechanism, while being exceedingly simple, is very strong and is convenient of operation. The ratchet-wheels on the drum-shafts are actuated by long and powerful levers, which may be operated from between adjacent cars or from the top of a car, and the length of the lever and disposition of the parts is such that the tripping action for dumping the load is easily accomplished.

The location of the dumping-doors and of their hinges is such that the car is especially adapted for the delivery of ore which is usually dumped through trestles, the doors serving as chutes for delivering the material to the center of the track. The extent of opening of the doors is controlled by the length of the chain. If desired, these doors may swing to a vertical position, as shown by dotted lines in Fig. 7, or shorter chains may be used, the doors falling only to an inclined position, as indicated by intermediate dotted lines in the same figure.

The hasp for securing the lever in its retracted position is of value as not only affording means for preventing wilful tampering with the load while the car is in transit, but for the purpose also of preventing accidental dumping. Should the actuating-pawl be suspended after loading, the lever would be very apt to swing to its advance position, due to the jolting or tipping of the car, and when in that position, and hence in engagement with the retaining-pawl, it might, by reason of its considerable length, disengage the pawl as the car traveled over a rough piece of road at high speed. When the lever 68 is thrown back to the position shown in Fig. 9, the heel of the pawl or hub 71 bears upon the retaining-pawl 72, so as to prevent the disengagement of the latter from the ratchet-wheel, thus coöperating with the lock for securing the lever in its retracted position to prevent accidental or malicious dumping of the car.

We claim as our invention—

1. In a dump-car, in combination, end sills, a plurality of central longitudinal trusses formed of sills and truss-rods, one of such trusses uniting the end sills and one thereof being of less length, and draft-rigging interposed between each end sill and the shorter of said trusses.

2. In a dump-car, in combination, end sills, a pair of central longitudinal sills and a plurality of truss-rods uniting the end sills, a pair of longitudinal sills between and of less length than the first-named longitudinal sills, a plate bearing against each end of such shorter sills, a truss-rod connecting the plates, and draft-rigging interposed between the end sills and the ends of such shorter longitudinal sills.

3. In a dump-car, in combination, end sills, a pair of longitudinal central trusses of unequal length and composed of sills and truss-rods, the longer of such trusses uniting the end sills, draft-rigging interposed between the end sills and the ends of the shorter truss, a double incline covering the two trusses, and door-closed apertures at each side of such incline.

4. In a dump-car, in combination, end sills, a pair of longitudinal central trusses of unequal length and composed of sills and truss-rods, the longer of such trusses uniting the end sills, draft-rigging interposed between the end sills and the ends of the shorter truss, a double incline covering the two trusses, door-closed apertures at each side of such incline, and mechanism at the end of the car for controlling such doors.

5. In a dump-car, in combination, a car-body having door-closed bottom openings, a shaft for controlling the doors, a ratchet-wheel on the shaft, a lever, a ratchet-actuating pawl carried by the lever, a retaining-pawl for holding the ratchet-wheel, and a projection on the lever for tripping the retaining-pawl, the said parts being so disposed that the retaining-pawl is disengaged from the ratchet when the lever is swung to the limit of its advance movement.

6. In a dump-car, in combination, a car-body having door-closed bottom openings, a shaft for controlling the doors, a ratchet-wheel on the shaft, a lever, a ratchet-actuating pawl carried by the lever, and a retaining-pawl for holding the ratchet-wheel, the lever being adapted, when swung to the limit of its advance movement, to disengage the retaining-pawl from the ratchet.

7. In a dump-car, in combination, a car-body having door-closed bottom openings, a shaft for controlling the doors, a ratchet-wheel on the shaft, a lever, a ratchet-actuating pawl carried by the lever, a retaining-pawl for holding the ratchet-wheel, and a fixed toe on the lever for tripping the retaining-pawl.

8. In a dump-car, in combination, a car-body having door-closed bottom openings, a shaft for controlling the doors, a ratchet-wheel on the shaft, a lever, a ratchet-actuating pawl carried by the lever, a retaining-pawl for holding the ratchet-wheel, a projection on the lever for tripping the retaining-pawl, and means for holding the lever out of engagement with the retaining-pawl.

9. In a dump-car, in combination, swinging dumping-doors, chains for controlling the doors, drums upon which the chains are wound, such drums having spiral peripheral grooves having flat bottoms and straight sides, and the chains being composed of straight links of greater width than the grooves, such links being adapted to enter the grooves obliquely.

10. In a dump-car, in combination, downwardly-opening dumping-doors, door-supporting chains, drums on which such chains are wound, ratchet-and-pawl mechanism for turning the drums, a retaining-pawl for the ratchet, the parts being so disposed that the heel of the actuating-pawl bears upon the toe of the retaining-pawl when the former is in its retracted position.

11. In a dump-car, in combination, downwardly-opening dumping-doors, door-supporting chains, drums on which such chains are wound, a ratchet-wheel on the axle of the drums, a lever fulcrumed on such axle, an actuating-pawl carried by the lever and coöperating with the ratchet-wheel, a retaining-pawl coöperating with the ratchet-wheel, the parts being so disposed that the retaining-pawl is held in engagement with the wheel by the backward pressure of the lever, and means for locking the lever in its retracted position.

12. In a dump-car, in combination, a car-body having door-closed bottom openings, a shaft for controlling the doors, a ratchet-wheel on the shaft, a lever, a ratchet-actuating pawl carried by the lever, means for holding the actuating-pawl out of engagement with the ratchet, a socket-plate, and a hasp pivoted to the socket-plate whereby to retain the lever when at the limit of its backward movement.

13. In a dump-car, in combination, downwardly-opening dumping-doors, door-supporting chains, drums on which such chains are wound, ratchet-and-pawl mechanism for turning the drums, a retaining-pawl for the ratchet, the parts being so disposed that the heel of the actuating-pawl bears upon the toe of the retaining-pawl when the former is in its retracted position, and means for locking the said pawls in such relation.

HENRY C. WILLIAMSON.
HERMAN PRIES.

Witnesses:
L. D. HAMRICK,
C. E. COMBS.